United States Patent
Henninger et al.

(10) Patent No.: US 8,209,351 B2
(45) Date of Patent: Jun. 26, 2012

(54) DISPLAY DEFINITIONS INTERFACE FOR AVIONICS COMMUNICATIONS SYSTEMS

(75) Inventors: Mark Henninger, Mill Creek, WA (US); Tatyana Shavshin-Strong, Phoenix, AZ (US); David Bibby, Scottsdale, AZ (US); Mark Hasenyager, Scottsdale, AZ (US); Marcus Earnest, Lynnwood, WA (US); Diane Buckley, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 801 days.

(21) Appl. No.: 11/959,121

(22) Filed: Dec. 18, 2007

(65) Prior Publication Data

US 2009/0157703 A1    Jun. 18, 2009

(51) Int. Cl.
*G06F 17/30* (2006.01)
(52) U.S. Cl. .................................. 707/793; 707/802
(58) Field of Classification Search .............. 707/770, 707/802, 999.104, 793
See application file for complete search history.

(56) References Cited

U.S. PATENT DOCUMENTS

| | | | | |
|---|---|---|---|---|
| 5,831,664 | A * | 11/1998 | Wharton et al. | 725/81 |
| 7,430,602 | B2 * | 9/2008 | Babbar et al. | 709/227 |
| 7,675,866 | B1 * | 3/2010 | Pauly | 370/252 |
| 2004/0008253 | A1 * | 1/2004 | Monroe | 348/143 |
| 2005/0181787 | A1 | 8/2005 | Judd et al. | |
| 2008/0154441 | A1 * | 6/2008 | Harrison et al. | 701/3 |
| 2009/0010230 | A1 * | 1/2009 | Lee et al. | 370/338 |
| 2009/0045981 | A1 * | 2/2009 | Jean et al. | 340/945 |
| 2009/0125222 | A1 * | 5/2009 | McCullough et al. | 701/120 |
| 2009/0242696 | A1 * | 10/2009 | Wilby | 244/102 SL |

OTHER PUBLICATIONS

Eric Barboni et al., A Formal Description Technique for Interactive Cockpit Applications Compliant with ARINC Specification 661, 2007, 8 pages.*
Model-Based Engineering of Widgets, User Applicantions and Servers Compliant with ARIC 661 Specification, 2007, 14 pages.*
"Draft 1 ARINC Specificaiton 661-2 Cockpit Display Sysetm Interface to User Systems", Aug. 2004, pp. 1-7, 214-216, and 265-278, Publisher: Aeronautical Radio Inc.
Verhoeven et al., "Prototyping Interactive Cockpit Applications", "NLR-TP-2005-066", Oct. 2004, pp. 1-16, Publisher: National Aerospace Laboratory NLR.

* cited by examiner

*Primary Examiner* — John Cottingham
*Assistant Examiner* — Noosha Arjomandi
(74) *Attorney, Agent, or Firm* — Fogg & Powers LLC

(57) ABSTRACT

A method for displaying data in an avionics communications system is disclosed. The method generates an ARINC 661 definition file and a user database from one or more user-defined inputs for a communications management function of an aircraft. To convey information relating the one or more user-defined inputs with at least one display of the aircraft, the method links one or more display attributes of the user database with the ARINC 661 definition file. Based on user interactions with the at least one display, the method updates display data of the at least one display using the contents of the ARINC 661 definition file and the user database.

17 Claims, 2 Drawing Sheets

DISPLAY DEFINITIONS INTERFACE FOR AVIONICS COMMUNICATIONS SYSTEMS

BACKGROUND

Current avionics communications systems features include at least one form of runtime communications for common displays available with an aircraft communication management function (CMF) product. Typically, any runtime communications does not provide support for a user-modified display or display interface. There is a need in the art for improvements in a display definitions interface for avionics communications systems of next-generation aircraft.

SUMMARY

The following specification discloses a display definitions interface for avionics communications systems. This summary is made by way of example and not by way of limitation. It is merely provided to aid the reader in understanding some aspects of at least one embodiment described in the following specification.

Particularly, in one embodiment, a method for displaying data in an avionics communications system is provided. The method generates an Aeronautical Radio, Incorporated (ARINC) 661 definition file and a user database from one or more user-defined inputs for a communications management function of an aircraft. To convey information relating the one or more user-defined inputs with at least one display of the aircraft, the method links one or more display attributes of the user database with the ARINC 661 definition file. Based on user interactions with the at least one display, the method updates display data of the at least one display using the contents of the ARINC 661 definition file and the user database.

DRAWINGS

Figure 1:
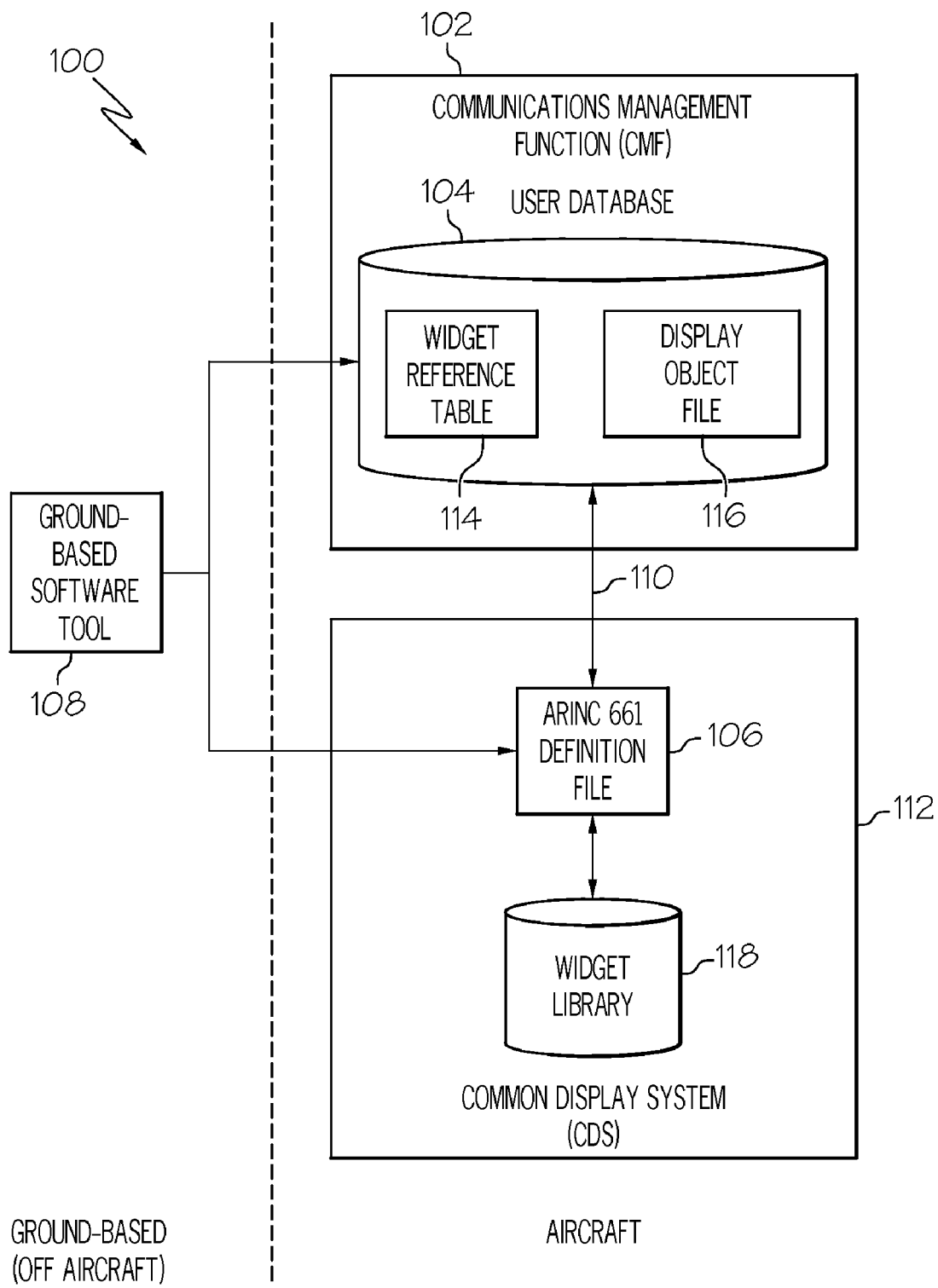
Figure 2:
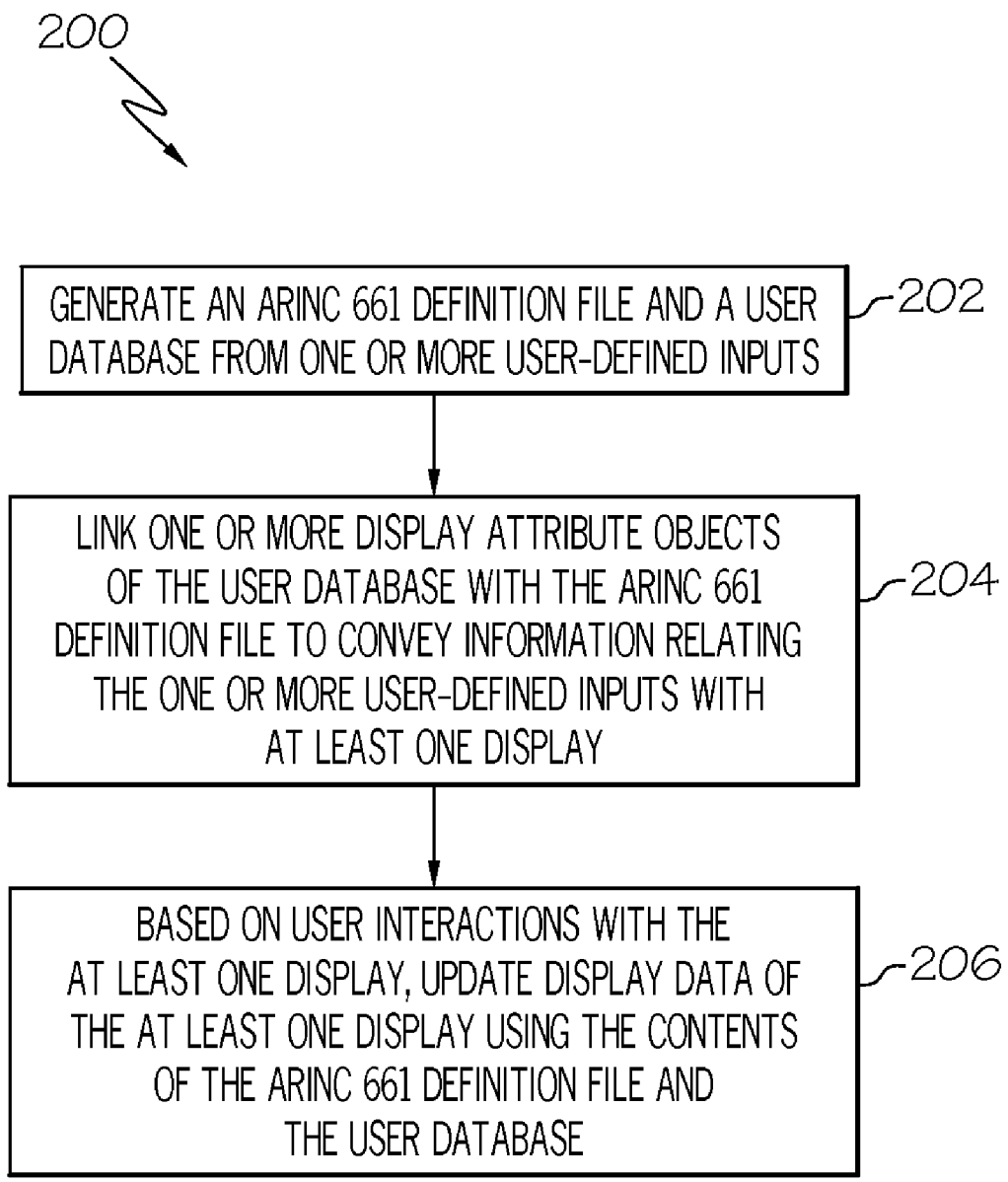

These and other features, aspects, and advantages are better understood with regard to the following description, appended claims, and accompanying drawings where:

FIG. 1 is a block diagram of an embodiment of a display definitions interface for avionics communications systems; and FIG. 2 is a flow diagram of a method for displaying data in an avionics communications system.

The various described features are drawn to emphasize features relevant to the embodiments disclosed. Like reference characters denote like elements throughout the figures and text of the specification.

DETAILED DESCRIPTION

Embodiments disclosed herein relate to a display definitions interface for avionics communications systems. In at least one embodiment, a ground-based software tool generates an ARINC 661 definition file for an avionics communication system based on one or more user-defined inputs. The ARINC display system interface specification 661, referred to herein as the ARINC 661 standard, specifies that a definition file be loaded in a common display system of the aircraft. In addition, the ARINC 661 standard provides for one or more displays that are airline-specific. For example, an airline-modifiable information (AMI) database is enhanced with ARINC 661 specific attributes from the definition file generated. In one implementation, a ground-based software tool for next-generation aircraft will have at least two outputs: (1) the AMI database and (2) the ARINC 661 definition file. The display definitions interface disclosed here allows a communications management function (CMF) within the communications system access to one or more avionics displays inside the aircraft.

As defined in this specification, the display definitions interface comprises a basic set of graphical user interface objects, hereafter referred to as "widgets." For example, each of the widgets corresponds to a displayable entity of the common display system in the CMF. The definition file defines the characteristics of all the instances of each widget allocated inside the common display system (CDS). The CMF addresses each widget through the display definitions interface to provide for a near real time configuration of the common display system in compliance with ARINC 661 specification standards. In one implementation, a widget reference table is added to the AMI database to support the display definitions interface between the CMF and the definition file for the common display system. The widget reference table provides a link between a widget ID of a selected object and its AMI attributes. Moreover, the common display system discussed herein manages the actual rendering of the widgets and monitors any flight crew interactions with the CMF. In one implementation, at least a portion of the widgets are "interactive widgets" that support the flight crew interactions with cursor control devices, keyboards, and the like.

FIG. 1 is a block diagram of an embodiment of a display definitions interface for an avionics communications system 100. The system 100 comprises a CMF 102 and a CDS 112 in operative communications with a ground-based software tool 108. The CMF 102 includes a user database 104 for an aircraft. The CDS 112 includes an ARINC 661 definition file 106 and a widget library 118. In the example embodiment of FIG. 1, the ground-based software tool 108 is configured to generate the user database 104 and the ARINC 661 definition file 106. The generated ARINC 661 definition file 106 is operable with the user database 104 in compliance with ARINC 661 display system interface standards. Moreover, the ground-based software tool 108 is further operable to provide user-defined data for the user database 104 (for example, an AMI database 104). In one or more alternate implementations, the user database 104 and the ARINC 661 definition file 106 are generated in separate graphical generator devices, or the like.

In one embodiment, the CMF 110 is operable on at least one of a microprocessor, a microcontroller, a field-programmable gate array (FPGA), a field-programmable object array (FPOA), a programmable logic device (PLD), or an application-specific integrated circuit (ASIC). In a similar embodiment, the CDS 112 is operable to manage rendering of a plurality of display objects stored in the widget library 118. For example, each of the plurality of display objects stored in the widget library 118 corresponds to a displayable entity (for example, a widget) of the CDS 112. In one implementation, the user database 104 comprises a widget reference table 114 and a display object file 116. For example, the widget reference table 114 is operable to support a display definitions interface 110 between the CMF 102 and the CDS 112. Moreover, the widget reference table 114 provides a link between a widget identification (ID) of each selected display object and attributes of the selected display object. In one embodiment, the display object file 116 retrieves the display attributes of each of the display objects defined in the ARINC 661 definition file 106.

In operation, the CMF 102 receives display attributes from the CDS 112 using the display definition interface 110. In one implementation, the CDS 112 updates the display attributes from the ARINC 661 definition file 106 for near real time communication updates between the CMF 102 and the CDS 112. For example, the CMF 102 updates display data using display object attributes retrieved from the ARINC 661 definition file 106 based on the widget ID received from the CDS 112. In the same implementation, the CMF 102 links the updated display data with the CDS 112 using the display definition interface 110. For example, the CMF 102 accesses at least one object reference in the widget reference table 114 between a selected user interface object associated with a flight crew interaction and the display attributes of the selected display object as discussed in further detail below. Moreover, the CDS 112 displays the updated data from the user database 104 with the received display attributes from the ARINC 661 definition file 106 in near real time. For example, the CMF 102 is operable to monitor flight crew interactions with the CDS 112.

In one implementation, the CDS 112 displays each displayable entity of the CMF 102 using the ARINC 661 definition file 106. When a particular widget is selected from the widget library 118, the CDS 112 retrieves the ID of the widget from the ARINC 661 definition file 106 and sends a widget selection event that contains the ID of the selected widget to the CMF 106 over the display definitions interface 110. The CMF 102 receives the widget selection event from the CDS 112 with the widget ID of the selected widget. The CMF 102 accesses the widget reference table 114 in the user database 104 to retrieve the reference of the display object corresponding to the widget ID, and accesses the display object file 116 to retrieve the display attributes for the selected display object. In this example implementation, the display attributes of the display object file 116 contains the widget ID of the selected display object. Moreover, the CMF 102 processes the selected display object and builds an output in the ARINC 661 display format with the widget ID and the display data for the selected display object. The CDS 112 receives the display data from the CMF 102 and updates the attributes of the identified widget in the widget library 118 with the received data from the CMF 102.

FIG. 2 is a flow diagram of a method 200 for displaying data in an avionics communications system, similar to the system 100 of FIG. 1. The method 200 addresses near real time communications support for the common display system of an aircraft communication management function in compliance with the ARINC 661 display system interface specification. For example, the method 200 generates a definition file and a user database from one or more user-defined inputs for the communications management function (block 202). In one implementation, generating the definition file based on the one or more user-defined inputs comprises creating the definition file and the user database in a ground-based software tool in operative communications with the at least one communications management function. In one implementation, creating the definition file and the user database in the ground-based software tool further comprises allocating the definition file to a common display system and allocating the user database to the communications management function.

The method 200 links one or more display objects of the user database with the definition file to convey information relating the one or more user-defined inputs with at least one display of the aircraft (block 204). Moreover, the method 200 accesses a reference table in the user database to link a selected display attribute object with a supported ARINC 661 display attribute. Based on user interactions with the at least one display, the method 200 updates display data of the at least one display using the contents of the ARINC 661 definition file and the user database (block 206). Moreover, using the display definitions interface comprises communicating the information relating the one or more user-defined inputs with the at least one display in near real time.

The methods and techniques described here may be implemented in digital electronic circuitry, or with firmware or software in a programmable processor (for example, a special-purpose processor or a general-purpose processor such as a computer), or in combinations of software and hardware. An apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating an appropriate output. The techniques may be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory (RAM) or a random access memory (ROM).

Storage devices suitable for tangibly embodying computer program instructions and data include all forms of non-volatile memory, including by way of example semiconductor memory devices, such as (electrically) erasable programmable read-only memory (EPROM or EEPROM), and flash memory devices; magnetic disks such as internal hard disks and removable disks; and magneto-optical disks, including but not limited to digital video disks (DVDs). Any of the foregoing may be supplemented by, or incorporated in, specially-designed application-specific integrated circuits (ASICs), and the like.

This description has been presented for purposes of illustration, and is not intended to be exhaustive or limited to the embodiments disclosed. Variations and modifications may occur, which fall within the scope of the following claims.

What is claimed is:

1. A method for displaying data in an avionics communications system, the method comprising:
   generating an Aeronautical Radio, Incorporated (ARINC) 661 definition file and a user database from one or more user-defined inputs for a communications management function of an aircraft, the user database comprising a widget reference table of display objects for the one or more user-defined inputs and a display object file;
   accessing the widget reference table of the user database to link one or more display attribute objects with the ARINC 661 definition file to convey information relating the one or more user-defined inputs with at least one display of the aircraft; and
   based on user interactions with the at least one display, updating display data of the at least one display using the contents of the ARINC 661 definition file and the user database;
   wherein generating the ARINC 661 definition file and the user database further comprises creating the ARINC 661 definition file and the user database in a ground-based software tool in operative communications with the communications management function;
   wherein creating the ARINC 661 definition file and the user database in the ground-based software tool further comprises:
      allocating the ARINC 661 definition file to a common display system in the aircraft; and allocating the user database to the communications management function.

2. The method of claim 1, wherein generating the ARINC 661 definition file and the user database comprises generating the ARINC 661 definition file and the user database based on ARINC 661 display interface standards.

3. The method of claim 1, wherein linking the one or more display attribute objects of the user database further comprises accessing the user database to reference a selected display object with a supported ARINC 661 display attribute.

4. The method of claim 1, wherein updating the display data of the at least one display comprises communicating the information relating the one or more user-defined inputs with the at least one display in near real time.

5. A computer program product comprising program instructions, embodied on a machine-readable storage medium, the program instructions cause at least one programmable processor having a communications management function to:
update aircraft display data in a user database using display attributes received from an Aeronautical Radio, Incorporated (ARINC) 661 definition file based on a widget ID received from a common display system having the ARINC 661 definition file, the ARINC 661 definition file generated in compliance with ARINC 661 display system interface standards;
accesses a widget reference table in the user database to retrieve an object reference of a display object corresponding to the widget ID; and
using the object reference, link the updated aircraft display data with the common display system;
create the ARINC 661 definition file and the user database in a ground-based software tool, wherein the ground-based software tool communicates with the communications management function;
allocate the ARINC 661 definition file to a common display system in the aircraft, and allocate the user database to the communications management function.

6. The computer program product of claim 5, wherein the program instructions that update the aircraft display data cause the at least one programmable processor to receive a display selection event in the communications management function from the display definitions interface.

7. The computer program product of claim 5, wherein the program instructions that link the updated aircraft display data with the common display system cause the at least one programmable processor to communicate the updated aircraft display data between the communications management function and the common display system in near real time.

8. The computer program product of claim 5, wherein the program instructions that link the updated aircraft display data with the common display system further cause the at least one programmable processor to access at least one object reference between a selected user interface object associated with a flight crew interaction and display attributes of the selected user interface object.

9. An avionics communication system, comprising:
a common display system located onboard an aircraft, the common display system including an Aeronautical Radio, Incorporated (ARINC) 661 definition file provided by a ground-based software tool and stored on at least one data storage device located onboard the aircraft; and
a communication management function located in an apparatus onboard the aircraft, the communication management function including a user database provided by the ground-based software tool, the user database stored on at least one data storage device located onboard the aircraft, the user database comprising a widget reference table of display objects for one or more user-defined inputs and a display object file;
wherein the communication management function receives display attributes from the common display system using a display definitions interface, and accesses the widget reference table in the user database to retrieve a reference of a display object corresponding to a widget identification (ID), wherein the reference provides a link between the widget ID and the display attributes, and wherein the communication management function accesses the display object file to retrieve the display attributes for the display object;
wherein the ARINC 661 definition file and the user database are created by the ground-based software tool, wherein the ground-based software tool communicates with the communications management function;
wherein creation of the ARINC 661 definition file and the user database in the ground-based software tool allocates the ARINC 661 definition file to a common display system in the aircraft, and allocates the user database to the communications management function.

10. The system of claim 9, further comprising the ground-based software tool; wherein the ground-based software tool is further operable to provide user-defined data for the user database in compliance with ARINC 661 display system interface standards.

11. The system of claim 9, wherein the common display system is operable to manage rendering of display objects.

12. The system of claim 9, wherein the common display system comprises a widget library operable to store a plurality of display objects, each of the display objects corresponding to a displayable entity of the common display system.

13. The system of claim 9, wherein the communication management function is operable on at least one of a microprocessor, a microcontroller, a field-programmable gate array (FPGA), a field-programmable object array (FPOA), a programmable logic device (PLD), or an application-specific integrated circuit (ASIC).

14. The system of claim 9, wherein the communications management function is operable to monitor flight crew interactions with the common display system.

15. The system of claim 9, wherein the communication management function further comprises:
a widget reference table operable to support the display definitions interface between the communications management function and the ARINC 661 definition file; and
a display object file operable to contain a widget identification of a selected display object.

16. The system of claim 15, wherein the communication management function provides the widget reference table as a link between the widget identification of the selected object and the display attributes of the selected display object.

17. The system of claim 15, wherein the communications management function is operable to retrieve the display attributes for the selected display object from the display object file.

* * * * *